No. 879,058. PATENTED FEB. 11, 1908.
C. C. LITTLE.
CAMERA SHUTTER RELEASE.
APPLICATION FILED FEB. 27, 1907.
2 SHEETS—SHEET 1.
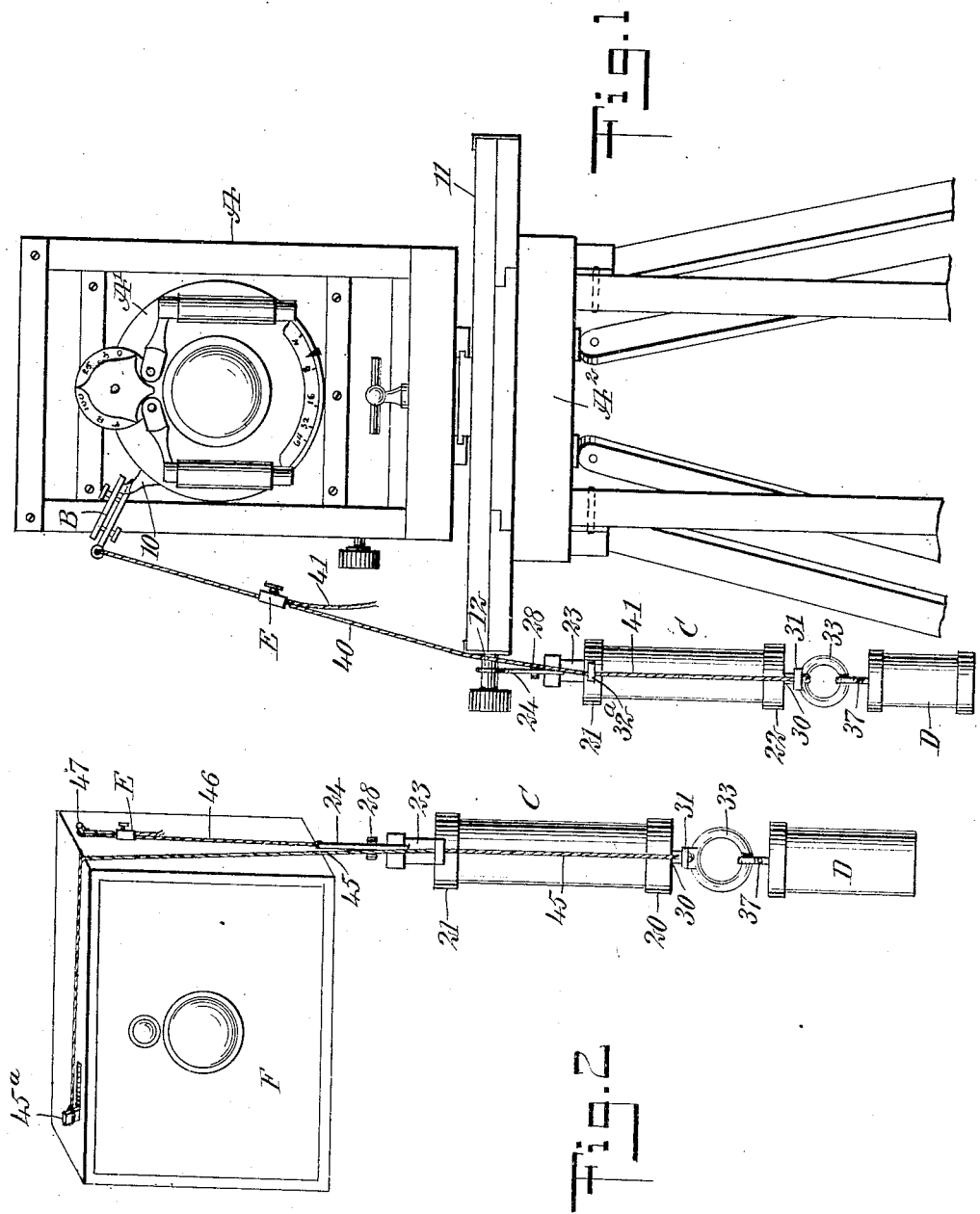
WITNESSES
INVENTOR
Charles C. Little
BY
ATTORNEYS

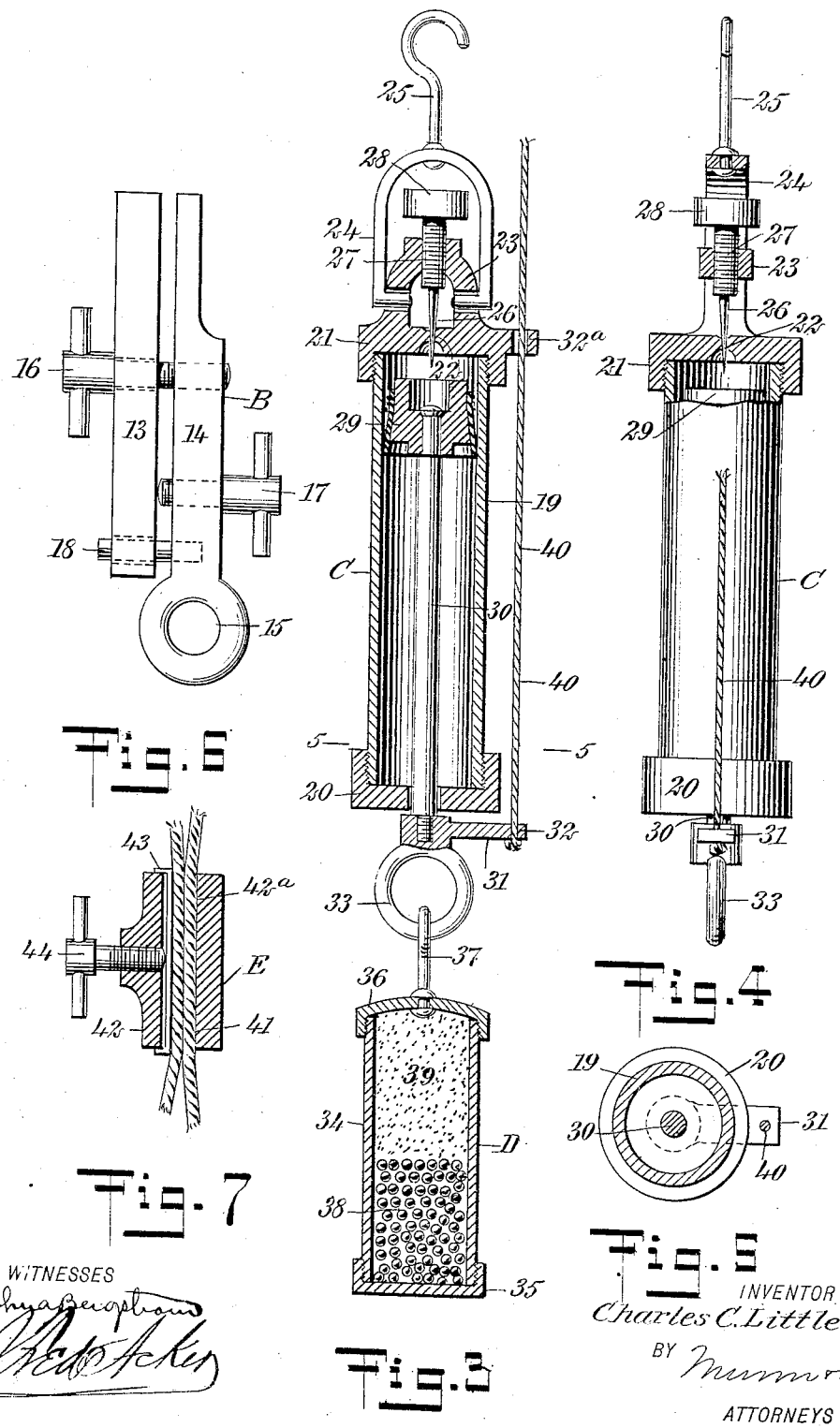

UNITED STATES PATENT OFFICE.

CHARLES CHASE LITTLE, OF SAN JOSE, CALIFORNIA.

CAMERA-SHUTTER RELEASE.

No. 879,058.      Specification of Letters Patent.      Patented Feb. 11, 1908.

Application filed February 27, 1907. Serial No. 359,628.

*To all whom it may concern:*

Be it known that I, CHARLES CHASE LITTLE, a citizen of the United States, and a resident of San Jose, in the county of Santa Clara and State of California, have invented a new and useful Improvement in a Camera-Shutter Release, of which the following is a full, clear, and exact description.

The purpose of the invention is to provide a device for automatically operating or releasing the shutter of a camera at a known interval after the photographer leaves it, enabling the photographer to appear in the picture taken.

A further purpose of the invention is to provide means for rendering the device readily adaptable to most all types and sizes of cameras, and to provide an attachment of the character described that will not only be exceedingly simple in construction, but also economic, readily applied, and which can be conveniently packed to occupy but little space.

The invention consists in the novel construction and combination of the several parts as will be hereinafter fully set forth and pointed out in the claims.

Reference is to be had to the accompanying drawings forming a part of this specification, in which similar characters of reference indicate corresponding parts in all the figures.

Figure 1 is a front elevation of a standard camera and the attachment applied thereto; Fig. 2 is a perspective view of a box or hand camera, and a side elevation of the applied attachment; Fig. 3 is a longitudinal section through the attachment drawn upon an enlarged scale; Fig. 4 is a sectional side elevation of the body portion of the attachment; Fig. 5 is a horizontal section taken practically on the line 5—5 of Fig. 3; Fig. 6 is a side elevation of a clamp that is employed for connecting the attachment to the finger release of a shutter when other means are not available; and Fig. 7 is a section through a clip adapted to connect the strands of a trip cord employed.

A represents a standard camera of any approved type, provided with an automatic shutter A' having the customary finger release 10. The camera A is shown adjustably supported on a body 11, said body being provided with a focusing screw 12, and the body 11 is carried by a tripod A².

In the event that the finger release 10 is provided with an eye, the attachment can be made directly thereto, but should the eye or any equivalent opening not be present, a clamp B is employed, shown in detail in Fig. 6, and this clamp is applied directly to the finger release 10, and the attachment in such event is made directly to the clamp. This clamp in its preferred form consists of two parallel members 13 and 14, one member, the member 14, for example, being provided with an eye 15 at one of its ends. A locking screw 16 is used to draw the two members 13 and 14 together, being loosely passed, for example, through the member 13 and made to enter a threaded aperture in the member 14, an adjustable screw 17 is also employed, shown carried by the member 14 and arranged for engagement with the member 13, whereby to limit the space between the two members. The construction of the said clamp B is completed by providing a guide pin 18, preferably at the end carrying the eye 15, which guide pin is attached to one member of the clamp and loosely enters the other member.

The body C of the attachment consists of a cylinder 19 of desired length, and diameter, which cylinder is provided with a lower head 20 and an upper head 21, both being by preference screwed upon the said cylinder. An opening 22 is made in the central portion of the upper head 21 and an arch 23 is constructed over the said opening 22 integral with the upper head 21, as is best shown in Fig. 3. A bail 24 is pivoted to the said arch 23 and a hook 25, or its equivalent, is connected with the upper portion of the said bail. The said opening 22 in the upper head 21 of the body C is closed or opened to a greater or lesser extent by the manipulation of an entering needle valve 26, shown in Figs. 3 and 4. This needle valve is provided with an exteriorly threaded shank 27 that is passed through a correspondingly threaded opening in the arch 23, and the said shank 27 is provided at its upper end with a head 28 located within the bail 24 so that the said needle valve is readily accessible for operation.

A piston 29 is mounted to slide in the cylinder 19 of the body C of the attachment. This piston is adapted for easy movement in the said cylinder but has practically air-tight engagement therewith. The piston 29 is provided with a rod 30 that is carried loosely out through the lower head of the cylinder 19, and at the lower end of the said piston rod 30, a horizontal arm 31 is secured that extends beyond a side of the said cylinder 19, and this arm 31 is provided near its outer end with an aperture 32, and just below the connection of said arm 31 with the piston rod 30, a ring 33, or its equivalent is secured to the said arm. In connection with the said body section C of the attachment, I by preference employ a weight D to draw down the piston 29. When the weight D is employed it is preferably constructed as is shown in Fig. 3, consisting of a cylindrical body portion 34 and lower and upper heads 35 and 36 ordinarily removable from the body portion. A hook 37 or the like is attached to the upper head 36 on said weight D, and adapted for engagement with the eye 33 at the lower portion of the body section C of the attachment.

The cylindrical portion 34 of the weight D is filled or partially filled, with shot 38, or the like, and when shot are employed, the space between the bulk of the shot and the opposing head of the body 34 of the weight is filled in with cotton, cloth, or equivalent material 39, to prevent the shot from rattling. Enough shot must be used to overcome the friction of the piston and the resistance of the shutter release to which the attachment is applied.

A cord 40 has one of its ends passed through the opening 32 in the arm 31, and is suitably secured to said arm, and this cord passes up at the outside of the cylinder 19 of the body portion of the attachment through the opening 32ª in the extension from the upper head 21. This cord 40 is carried up and is passed through an eye in the finger release 10 if such an eye is present, if not, the cord is passed through the eye 15 in the clamp B previously applied to the said finger release. The upper end of the cord 40 is then carried down through a clip E through which the main portion of a cord has been previously passed, as is shown particularly in Fig. 7. This clip E consists of a block 42 having an opening 42ª extending through from one end to the other, in which opening the cord is received. A follower 43 is likewise located in the opening 42ª, which follower is pressed against the parallel and engaging strands of the cord by means of a set screw 44, or equivalent thereof, located in said block.

In the operation of the attachment, the needle valve having been set to admit more or less air to the cylinder 19 of the body section C and the time of movement of the piston having been calculated, the weight to be applied to the piston rod 30 being known, the hook 25 of the cylinder is passed over the focusing screw 12 of the camera, or over any convenient projection adjacent to that side of the camera at which the finger release is located, then the free end of the cord 40 is connected with the finger release in the manner heretofore described. After the attachment of the piston rod 30 to the finger release 10, the weight D is added, whereupon the operator can take a position in the landscape, or in a group to be photographed, and at the proper time the piston 29 will have dropped down sufficiently far to cause the finger release to be tripped. In order to determine the time of release, I place the piston at a point near the bottom of the cylinder and adjust the length of the cord so that it just trips the shutter. Then I place the piston at the top of the cylinder, the needle valve being wide open, and attach a weight and determine by experiment how much shot is required to overcome the friction of the piston and the resistance of the shutter, and manipulate the valve until it operates at a desired interval.

In Fig. 2 I have illustrated the adaptation of the attachment to a box, magazine or hand camera F. The attachment employed is identical in construction with that which has been previously described, but the cord 45 from the arm 31 in this case is carried up centrally and is attached in any desired way to the finger release 45ª for such camera, and a cord 46 is employed attached to the bail 24, for example, and to a pin or equivalent device 47 secured to a firm portion of the casing of the camera, such attachment being made preferably by forming a loop at the free end of the cord 46 through the medium of the clip E.

One advantage of this device consists in the fact that it can be adapted to a great variety of shutters by means of an adjustable weight.

Having thus described my invention, I claim as new and desire to secure by Letters Patent,—

1. An automatic release for camera shutters, consisting of a cylinder, a suspension device for the cylinder adapted to be supported by the camera structure, a piston for the cylinder, a rod for the piston, a tension device carried by the rod and acting to draw the same downward, a needle valve at the upper end of the cylinder for admitting air to the cylinder above the piston, and for regulating the air supply, means connected with the piston rod and adapted for attachment to the finger release of the shutter, and means for connecting the first named means to the said finger release.

2. An automatic release for camera shutters, consisting of a cylinder, means for supporting the cylinder from a camera structure, a valve at one end of the cylinder adapted to control the admission of air thereto, a piston within the said cylinder and means for connecting the piston with the finger release of a camera shutter, and an adjustable weight exerting pulling power on the piston in the direction from the source of air supply.

3. In a release for camera shutters, a cylinder, means for supporting the said cylinder from the camera structure, an adjustable needle valve penetrating one head of the cylinder, a piston within the cylinder, a rod extending from the piston out through a head of the cylinder, means connected with the piston rod for connecting it with the finger release of a camera shutter, and an adjustable weight applied to the projecting end of the piston rod.

4. In a release device for camera shutters, the combination with a cylinder, means for attaching the cylinder to a camera structure, a needle valve at one end of the cylinder, a piston within the cylinder, a rod attached to the piston and extending out beyond the opposite end of the cylinder, and means for connecting the piston rod with the finger release of a shutter, of a second cylinder, weights located in the said second cylinder, and means for connecting the weighted cylinder with the piston rod of the first named cylinder.

5. In a release device for camera shutters, the combination with the body of a cylinder, a piston therefor, a rod attached to the piston and extending out through the lower end of the said cylinder, a flexible element adapted to connect the piston rod with the finger release of the shutter, and a needle valve at the upper end of the said body of the cylinder, of a weight removably connected with the outer end portion of the piston rod, and means for attaching the said flexible connecting element to said camera finger release.

In testimony whereof I have signed my name to this specification in the presence of two subscribing witnesses.

CHAS. CHASE LITTLE.

Witnesses:
    EDW. F. DISTEL,
    TOWNSEND WOOD.